Feb. 22, 1927. 1,618,567

C. D. BROWN

AUTO TRAY HOLDER

Filed Sept. 22, 1925

C. D. Brown
Inventor

Patented Feb. 22, 1927.

1,618,567

UNITED STATES PATENT OFFICE.

CLAUDE D. BROWN, OF FORT SMITH, ARKANSAS, ASSIGNOR OF ONE-HALF TO JOHN W. EADIE, OF FORT SMITH, ARKANSAS.

AUTO TRAY HOLDER.

Application filed September 22, 1925. Serial No. 57,962.

The present invention has reference to trays and tray supports especially designed for use in connection with motor vehicles, the construction of the support being such as to permit the same to be readily and easily clamped to the door of a motor vehicle.

An important object of the invention is to provide a device of this character which when positioned on the door of a vehicle may be locked against accidental displacement.

Another object of the invention is to provide a clamping means adapted for use in connection with motor vehicle doors of various thicknesses.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
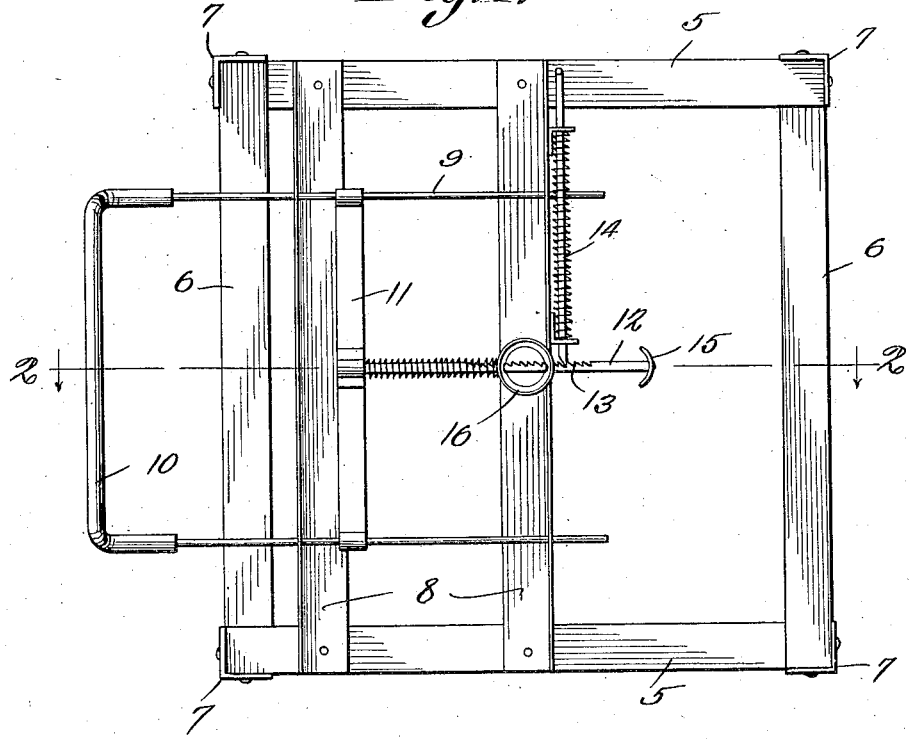
Figure 1 is a bottom plan view of a tray support constructed in accordance with the invention.
Figure 2:
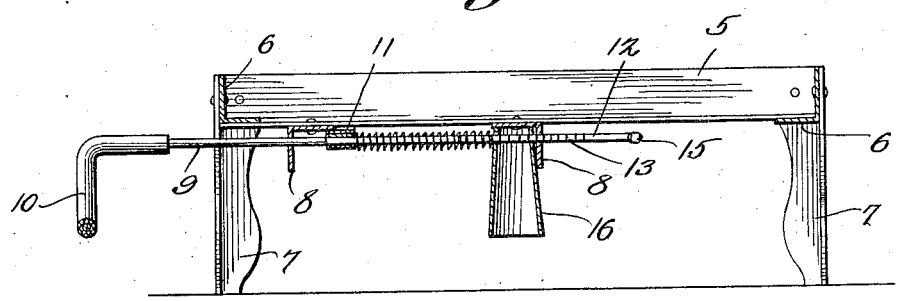
Figure 2 is a sectional view taken on line 2—2 of Figure 1.

Referring to the drawing in detail, the support includes a frame comprising side bars 5 and end bars 6, which side and end bars are bolted together in the usual and well known manner.

The support also includes leg members 7 that are secured to the side and end members so that the support may be positioned on a flat surface, adapting the device for use as a table.

Connecting the side members 5 are angle bars 8, which are supplied with aligning openings for the reception of the arms 9 of the clamping member 10 which is adapted to move towards and away from the support when the clamping member 10 is positioned over a door of a vehicle.

Secured to the arms 9 is a bar 11 that is provided with an opening in which one end of the adjusting rod 12 is secured, the adjusting rod 12 being supplied with a plurality of teeth 13 engaged by one end of the latch member 14, so that the rod 12 may be locked in its positions of adjustment.

A handle indicated at 15 is secured at one end of the rod 12 so that an operator may readily move the clamping member 10 to adjust it to its support. Disposed centrally of the support is a handle 16 which may be grasped by the operator to hold the support in position while it is being clamped to the door of a vehicle.

Figure 3:
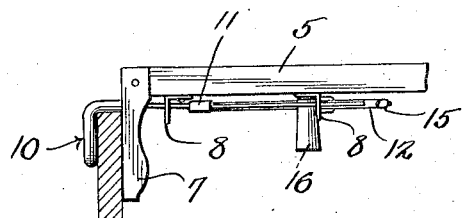
Figure 3 is a fragmental sectional view showing the tray support as positioned on a motor vehicle door.

From the foregoing it will be obvious that when the device is positioned over a door of a vehicle and the clamping member 10 is moved to a position as illustrated by Figure 3 of the drawing, the clamping member 10 will cooperate with the leg member 7 in providing a clamp for securing the support in position so that a tray may be placed thereon for the convenience of the user.

A coiled spring indicated at 17 is positioned on the rod 12 and is disposed between the bar 11 and handle 16 so that as the arms 9 and clamping member carried thereby are moved towards the support, the spring will be placed under tension to the end that when the locking member releases the rod 12 the spring will automatically move the clamping member 10 to its inactive position.

In the use of the device due to the construction of the frame, the device may be employed for supporting a suitable tray for various purposes.

I claim:—

In a support of the class described, a frame including angle bars, said angle bars having openings formed therein, a clamping member embodying arms extending through the openings, a bar connecting the arms, an adjusting rod having connection with the central portion of the bar to move the clamping member, and a latch member cooperating with the adjusting rod for holding the adjusting rod in various positions of adjustment.

In testimony that I claim the foregoing as my own, I have hereto affixed my signature.

CLAUDE D. BROWN.